Nov. 30, 1965  A. L. BAKER ETAL  3,220,297
SELF COMPENSATING TELESCOPE LEVEL HAVING FIXED
AND PENDULUM MOUNTED PAIRS
OF REFLECTING SURFACES
Filed Feb. 26, 1959
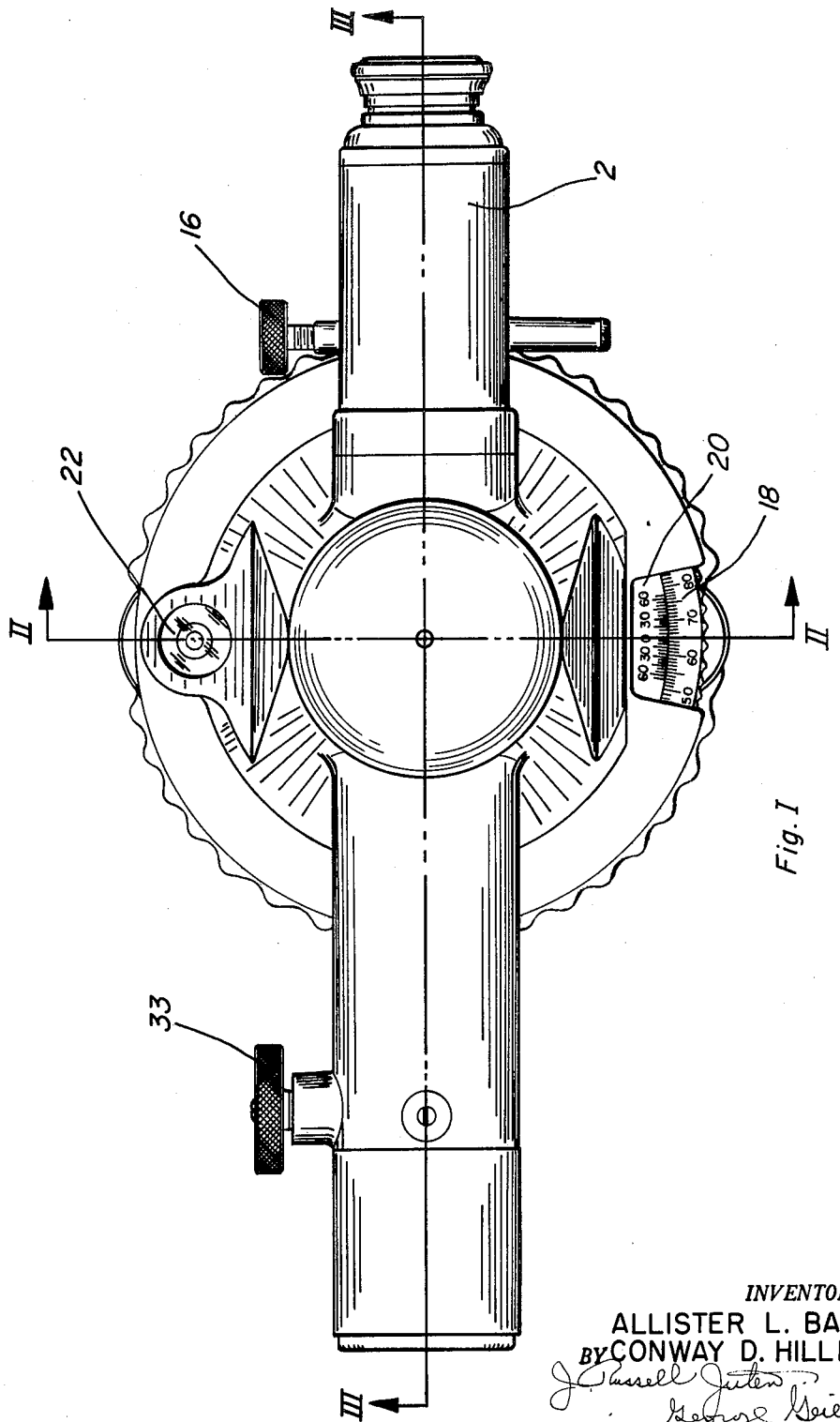
Fig. I
INVENTORS
ALLISTER L. BAKER
CONWAY D. HILLMAN
BY
ATTORNEY + AGENT

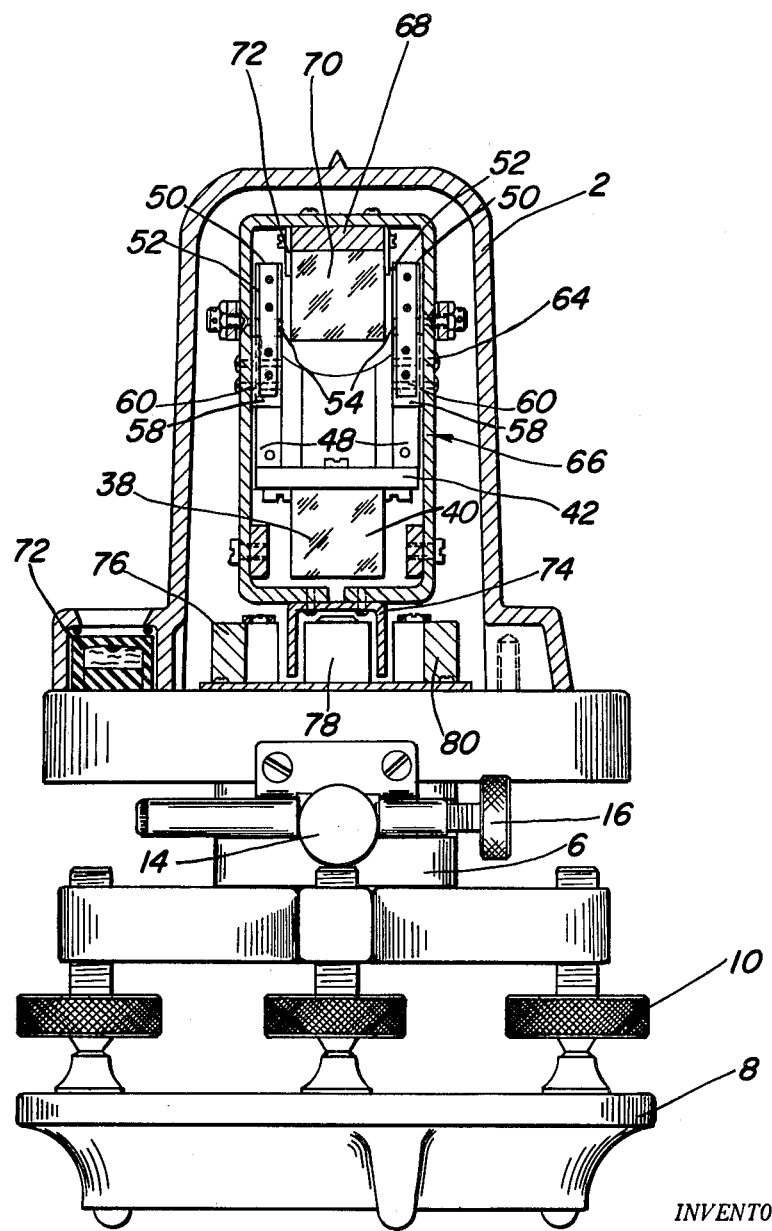
Fig. II

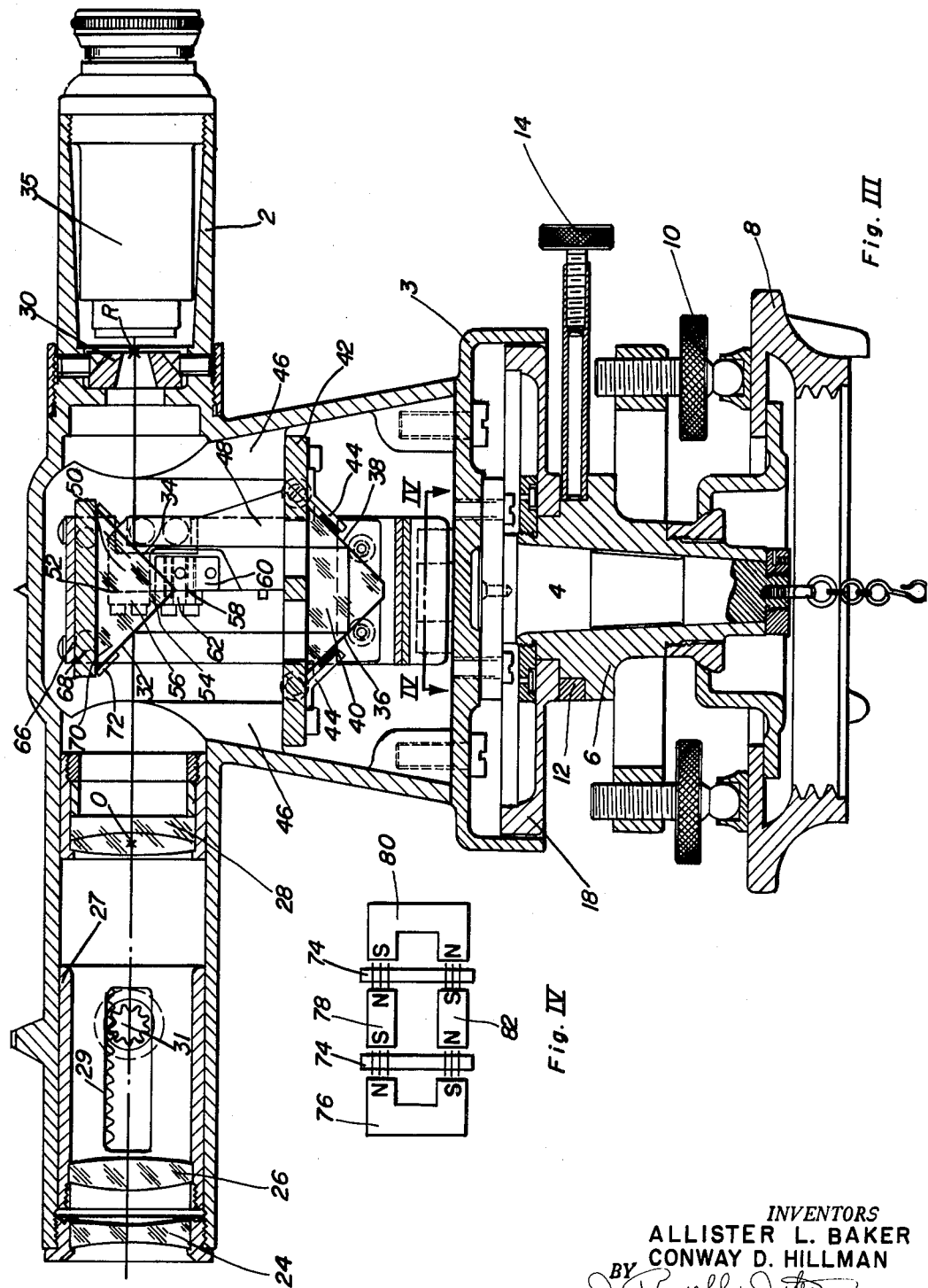

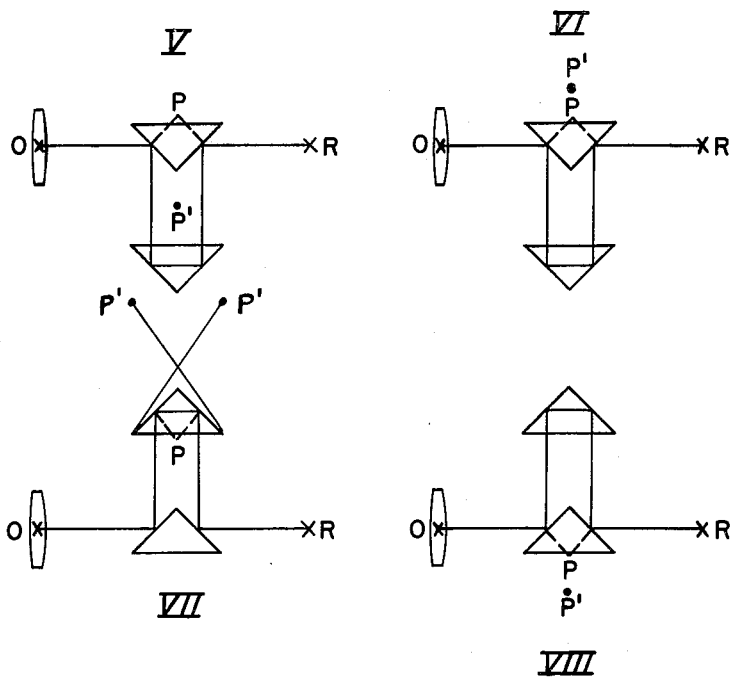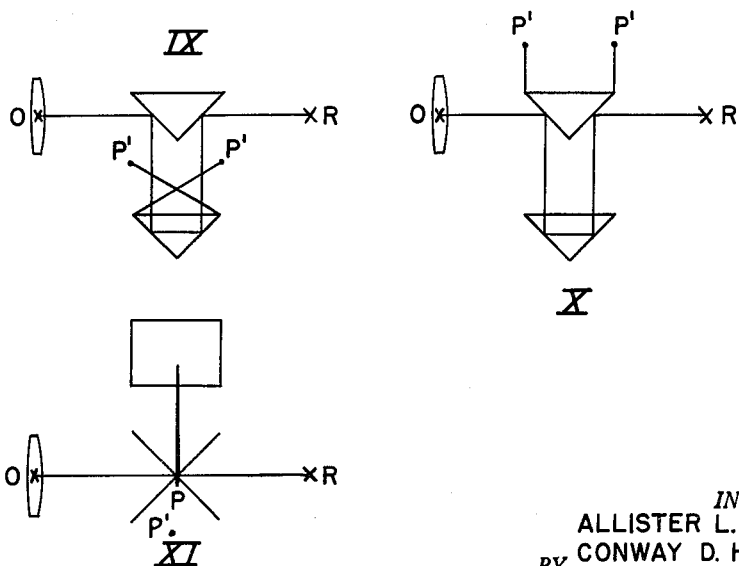
INVENTORS
ALLISTER L. BAKER
CONWAY D. HILLMAN
ATTORNEY + AGENT

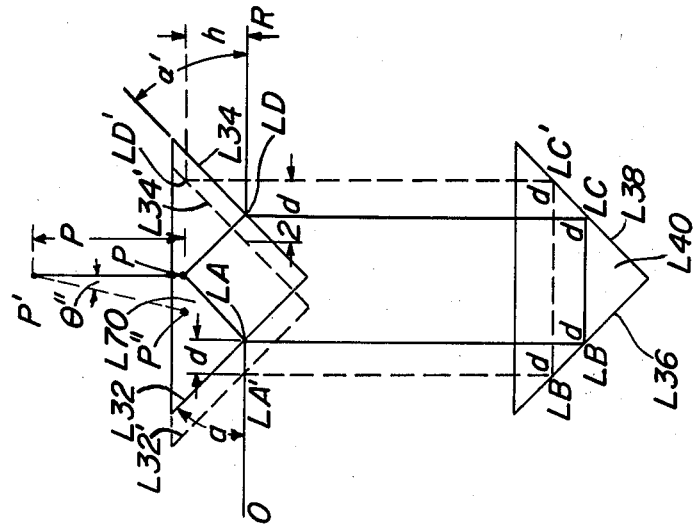
Fig. XIII
$h = 2d \tan \alpha = 2p\theta'' \tan \alpha$
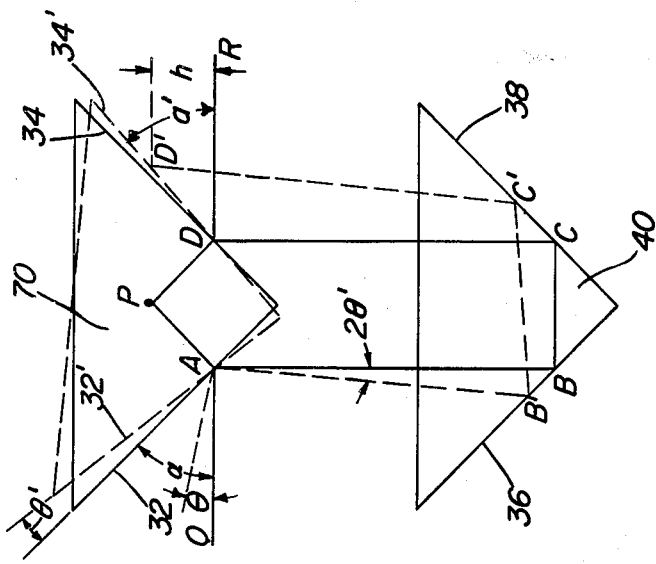
Fig. XII
$AB + BC + CD = A'B' + B'C' + C'D' = S$
$h = 2S\theta'$ United States Patent Office 3,220,297
Patented Nov. 30, 1965

3,220,297
SELF COMPENSATING TELESCOPE LEVEL HAVING FIXED AND PENDULUM MOUNTED PAIRS OF REFLECTING SURFACES
Allister L. Baker, Denville, and Conway D. Hillman, Millburn, N.J., assignors to Keuffel & Esser Company, Hoboken, N.J.
Filed Feb. 26, 1959, Ser. No. 795,645
7 Claims. (Cl. 88—1)

This invention relates to an optical level of the type used by surveyors or in optical tooling. More particularly the invention relates to such a level in which the line of sight is automatically held level or horizontal within certain limits of the tilt of the base by means of a pendulum device.

Patent No. 2,779,231 granted on January 29, 1957 to Martin Drodofsky describes a class of optical levels in which the pendulum member is suspended on a plurality of links or flexible members. The present invention relates to a new class of self-compensating optical levels which makes use of two pairs of reflecting surfaces mounted in the optical path of a telescope. One of the pairs of reflecting surfaces lies above the other. One of the pairs is carried on a pendulum and the other is fixed on the support for the telescope. In this class of optical levels it is not necessary to suspend the pendulum on a plurality of links or flexible supports but a simple pendulum with one point of support can be used. However, in certain embodiments of the invention it may be desirable to make use of a plurality of suspending links or flexible supports as generally disclosed in the Drodofsky patent.

The new level depending only upon the proper arrangement of the two pairs of reflecting surfaces, one carried on the pendulum and the other fixed, is comparatively simple in design and construction. It can be made so that the line of sight is colinear with the eyepiece and objective of the telescope which is recognized as the most convenient alignment for leveling. By making use of the principles described in copending application Serial No. 681,023 filed August 29, 1957 by Conway D. Hillman, now Patent 2,937,570 it is possible to construct the new type of level in an extremely precise form which will give a level line of sight from an unusually near distance all the way to infinity.

The above objects of the invention and the means for their attainment will be more fully understood after reading the following description taken in connection with the accompanying drawings in which FIG. I is a view in plan of an optical level made according to the invention.

FIG. II is an elevation of the level with the upper portion being shown in section taken along the line II—II of FIG. I along the pendulum supporting straps with the strap clamping plates omitted and showing the strap attaching screws in section.

FIG. III is a view in sectional elevation taken along the line III—III in FIG. I and looking in the direction of the arrows.

FIG. IV is a view in partial sectional plan taken along the line IV—IV of FIG. III and looking in the direction of the arrows.

FIGS. V-XI are views in diagrammatic elevation showing various modifications of the essential optical elements of an optical level constructed in accord with the present invention.

FIG. XII is a view in diagrammatic elevation showing the effect of relative tilting of the reflecting surfaces of the present invention.

FIG. XIII is a view in diagrammatic elevation showing the effect of relative displacement of the reflecting surfaces of the present invention.

Considering first the complete embodiment of the invention shown in FIGS. I-IV the telescope housing 2 is secured to a vernier plate 3 by screws as shown in FIG. III. The vernier plate 3 is in turn secured to a spindle 4 which can be rotated within a leveling head 6 about a vertical axis. The leveling head 6 is mounted for rough leveling by means of the leveling screws 10 with respect to a support 8 adapted for attachment to a tripod head. A clamp ring 12, operated in conventional manner by means of the knurled-headed screw 14, is provided for holding the telescope in a desired position around the vertical axis. A conventional tangent screw 16 acting against the arm projecting from the clamp ring 12 to the clamp screw 14 is provided for fine adjustment of the telescope about the vertical axis. A graduated protractor scale or divided horizontal circle 18 is carried in rotatable position on the leveling head 6 so that the position of the telescope in azimuth can be read with respect thereto by means of the vernier 20 secured to the vernier plate 3. A circular level vial 22 is carried by the telescope housing 2 on the vernier plate 3 to indicate when the housing has been leveled sufficiently by means of the leveling screws 10 to permit the pendulum device hereinafter described to function properly. This level vial 22 may be provided with a circle marked on its upper surface of a diameter such that whenever the bubble falls within this circle the base of the telescope housing will have been leveled to the required degree.

The embodiment shown in FIGS I-IV is provided with an optical system constructed according to co-pending application Serial No. 681,023, now patent 2,937,570, and has an objective combination composed of a negative objective lens 24 a positive focusing lens 26, a fixed lens 28 and a reticle 30. In accord with the co-pending application the focal lengths of the negative objective lens 24 and the positive focusing lens 26 are chosen so that their algebraic sum is equal to the optical separation between these two lenses when the telescope is focused at infinity. Furthermore the light rays entering the fixed lens 28 from any object upon which the telescope has been focused are always parallel.

The focusing lens 26 is mounted in a draw tube 27 which can be made to slide in the telescope housing 2. For this purpose the draw tube 27 is provided with a rack 29 which can be moved by the pinion 31 journaled in the telescope housing 2 and operated by means of the knurled knob 33 (FIG. I).

The reticle 30 is observed through an eyepiece 35, which may be a conventional 4-lens erecting eyepiece (not shown in detail).

Two pairs of reflecting surfaces are mounted in the optical path between the fixed lens 28 and the reticle 30. In this embodiment the pair of reflecting surfaces 32 and 34 lie on the line joining the lens 28 and the reticle 30. In order to simplify some of the following discussion, the line joining the center of the objective lens to the reticle will be referred to hereinafter as the line OR. A second pair of reflecting surfaces 36 and 38 lies directly below the reflecting surfaces 32 and 34. In this case the pair of reflecting surfaces 32 and 34 are carried on a pendulum member and the pair of reflecting surfaces 36 and 38 are fixed within the telescope housing. It will be understood that either or both pairs of reflecting surfaces may be surfaces of a prism or other polished piece of glass as shown, or they may in the case of either or both pairs be made up of two separate mirrors which are mounted in the proper orientation with respect to each other. It will also be understood that whenever the glass of a prism lies in the optical path between the reflecting surfaces, the optical path of a ray through this glass will be effectively equal in distance traveled to the actual distance traveled along the path of the ray through the glass divided by the index of refraction of the glass.

As shown in FIG. III the prism 40 provided with the reflecting surfaces 36 and 38 is held against a mounting plate 42 by the clips 44. The mounting plate 42 provided with openings for the passage of light is secured against the bosses 46 provided in the telescope housing casting as shown.

Two supports 48 extend vertically from above the mounting plate 42 and are carried thereby. As shown in FIG. III two projections 50 extend in the longitudinal direction of the telescope to flat surfaces 52 lying in a plane parallel to the vertical axis of the instrument and perpendicular to the optical axis of the telescope. Two flat flexible members 54 are held against the flat surfaces 52 by means of the plates 56 and screws extending therethrough. The flat flexible members 54 extend below the flat surfaces 52 and also engage flat surfaces 58 on members 60 fixed to the inside surfaces of the sides of an open ended box-like pendulum frame 66. The flat flexible members 54 are held against the flat surfaces 58 of members 60 by plates 62 and by screws extending therethrough and received in tapped bores in members 60. As shown in FIG. II screws 64 secure the members 60 to the pendulum frame 66. A flat mounting plate 68 is secured to the inner surface of the top of the pendulum frame 66 by screws as shown. A prism 70 is held against the flat mounting plate 68 by means of clips 72. The prism 70 is provided with the reflecting surfaces 32 and 34.

The flexible members 54 act as a pivot so that prism 70 and all parts necessary to hold it are tilted with respect to the housing 2 by action of gravity to a predetermined position depending on the tilt of the instrument within limits.

It will be understood that the reflecting surfaces 32, 34 and 36 and 38 can be provided in any convenient conventional manner for example as by aluminizing the polished glass surfaces of the prisms 40 and 70. In the case of internal reflecting surfaces as utilized in the prism 40 it may not be necessary to aluminize them if the angular relationships are such that it is possible to rely on the well known principle of total internal reflection.

A channel 74 of high electrical conductivity material such as copper or aluminum is secured to the bottom of the pendulum frame 66 as shown so that its extremities will extend between the poles of the permanent magnets 76, 78, 80 and 82 shown in FIG. IV. As shown in FIG. IV these magnets are mounted so that their unlike poles are adjacent in order to get the maximum amount of magnetic flux passing through the high conductivity material of the channel 74 so that the pendulum frame 66 will be magnetically damped in an effective manner. The permanent magnets 76, 78, 80 and 82 are preferably formed of a high strength permanent magnet material.

FIGS. XII and XIII illustrate the two ways in which the movement of one of the prisms 70 and 40 with respect to the other can affect the principal ray passing perpendicularly through the objective combination of lenses. In FIG. XII the effect of a rotation of the prism 70 with respect to the prism 40 is shown. As shown in FIG. XII the angle $\theta$ shows the actual tilt of the entire instrument. The prism 70 is assumed to rotate an angle $\theta'$ with respect to the prism 40 about a point P which is at the intersection of perpendiculars to the reflecting surfaces 32 and 34 drawn from the points A and D, which are the intersections of the line OR with the surfaces 32 and 34. The angle $\theta'$ is assumed positive for clockwise rotations. After rotation the principal ray OA is reflected by the surface 32' instead of by the surface 32 and the reflected by ray AB' will make an angle $2\theta'$ with the ray AB. Similarly the ray B'C' will make an angle $2\theta'$ with the ray BC and the ray C'D' will make the angle $2\theta'$ with the ray CD. Since the invention is only concerned with small angles $\theta'$ it is possible to assume that:

$$AB+BC+CD=A'B'+B'C'+C'D'=S$$

and that the sine and tangent of the angle $\theta'$ are equal to $\theta'$. Under these conditions, $h$, which represents the displacement of the principal ray at the reticle is substantially equal to $2S\theta'$ as indicated on the drawing. S is defined as the optical distance along the optical path of the principal ray from the first reflection from the pivoted pair of reflecting surfaces thence to the first reflection from the fixed pair of reflecting surfaces, thence to the second reflection from the fixed pair of reflecting surfaces, thence to the second reflection from the pivoted pair of reflecting surfaces.

FIGURE XIII illustrates the effect of a displacement, $d$, of the prism L70 with respect to the prism L40. As indicated on the drawing, in this case: $h=2d \tan \alpha$. The angle $\alpha$ is the angle which the pivoted reflecting surfaces make with the principal ray. If these angles are unequal it would be necessary to write: $h=d \tan \alpha + d \tan \alpha'$.

The effect of a displacement $d$ will have to be considered whenever the actual pivot point of the pendulum is not located at the point P as defined above in connection with FIG. XII. If it is now considered that the displacement $d$ of the prism L70 with respect to the prism L40 is the result of the swinging through an angle $\theta''$ of this prism about the actual pivot point P' and $p$ is the distance from this pivot point P' to the point P defined as above; $d=p\theta''$ for small values of the angle $\theta''$ and $h=2p\theta'' \tan \alpha$.

In applying the principles illustrated in FIGS. XII and XIII to the embodiment of the invention shown in FIG. III it is first necessary to note that if both prisms 70 and 40 are assumed fixed to the telescope housing and the line joining the second nodal point of the objective combination made up of lenses 24, 26 and 28 and the center of the reticle 30 (line OR) is inclined to the level direction by a small angle $\theta$ the principal ray passing through the second nodal point of the objective combination will make this angle $\theta$ with the line OR. This angulr relationship between the direction of the principal ray when the telescope is tilted at the small angle as described and the direction of the principal ray when the telescope is perfectly level carries through the optical system from the lens 28 past the prisms 70 and 40 to the reticle 30. This relationship will hold for any type of objective combination. For example, the lens 28 can be a fixed lens and focusing accomplished by lens 26 as shown in FIG. III. It will also hold if the lenses 24 and 26 are omitted and focusing is accomplished by movement of the lens 28 itself. The relationship will also hold for the conventional surveying instrument telescope optical construction including a fixed objective lens and a movable focusing lens provided $f$ the focal length of the objective, is measured from the nodal point of the combination if both lenses are to the objective side of the reflecting surfaces and from the nodal point of the objective lens alone if the focusing lens is to the opposite side of the reflecting surfaces.

If one of the prisms 70 and 40 is permitted to rotate and displace by reason of its being suspended on a pendulum, the necessary condition that such rotation and displacement of the prism will bring the center of the image formed by the lens 28 at the reticle 30 back in centered position for any small tilt of the telescope can be written as follows utilizing the terms as defined for the FIGURES XII and XIII examples.

$$f\theta+2S'\theta+p\theta'' \tan \alpha+p\theta'' \tan \alpha'=0$$

In general it will be possible to assume that angles $\theta'$ and $\theta''$ are related to the angle $\theta$ by constant factors which will depend upon the pendulum construction. It is therefore possible to set $\theta'$ equal to $m\theta''=m'\theta$ and $\theta$ in the above formula and after dividing by $\theta$ the formula may then be written:

$$f + 2Sm + pm' \tan \alpha + pm' \tan \alpha' = 0$$

For a pendulum mounted for rotation about a single axis perpendicular to the plane of FIG. III in a frictionless manner, the factors $m$ and $m'$ in the above formula will be equal to 1. If friction is present or if the pendulum is mounted on flat flexible members such as the members 54 in the embodiment of FIGS. I–IV in which the flexible members do not have negligible resistance to bending, $m$ and $m'$ will be equal to fractions less than 1. By using the principles set forth in the Drodofsky patent referred to above it is possible to control the factor $m'$ at will and to give it negative as well as positive values. However, in such cases $m'$ will not necessarily equal $m$.

The values of $m$ and $m'$ may be determined empirically such as by actual use of a particular strap material having the desired characteristics or by other means to produce the pivot action for the pendulum effect, and accordingly it is possible for one skilled in the art to obtain the desired values for the particular type of pivot action used in the instrument.

In order that the formulae given above will have a wide application to a wide variety of embodiments of the invention, the sign of $p$ is defined as follows:

| Relation of pivoted reflectors to line OR | Relation of pivoted reflectors to fixed reflectors | Location of p' suspension with respect to P | Sign |
|---|---|---|---|
| On | Above | Above | + |
| On | Above | Below | − |
| On | Below | Above | − |
| On | Below | Below | + |
| Off | Above | Above | − |
| Off | Above | Below | + |
| Off | Below | Above | + |
| Off | Below | Below | − |

Thus the formulas given above are valid for a wide variety of conditions including modifications in which the fixed prism is below the pivoted prism, the fixed prism is above the pivoted prism, the pivoted prism is along the line OR, the pivoted prism is off the line OR, the axis or axes of suspension are above the point $=p$ as defined, the axis or axes of suspension are below the point P as defined, for values of the angle $\alpha$ and $\alpha'$ other than 45° whether equal or unequal and even if the apexes of the prisms 70 and 40 do not lie directly above each other when the telescope is perfectly level. However in the latter case the center of the reticle will have to be set below or above the center of the lens 28.

Upon reference to FIGURE XII, the line of sight of the telescope OR may be deviated a vertical distance $h$ assuming that the prism 70 is rotated the angle $\theta'$ from the full line position to the dotted line position. The path of reflection from the left face of prism 70 is changed from the full line AB to the dotted line AB′ which line makes an angle of $2\theta'$ to the line AB since the prism 70 has been rotated by angle $\theta'$ and since the angle of reflection is equal to the angle of incidence and the left reflecting surface has been pivoted angle $\theta'$ from the full line position 32 to dotted line position 32′ and the resulting path of light AB′ is therefore changed by the angle $2\theta'$. Similarly, the angles of incidence and reflection are changed on prism 40 which in effect amounts to a change in the distance or arc between continuations of lines AB and AB′ so that the length of such lines correspond to the length S of the path of light as explained above. Since the tangent and the angle measured in radians are substantially identical in small angles, the angle measured in radians times the length of the path of light S equals the distance between point D and the intersection of line DR and line C′D′ and since the distance desired to be measured is the height or vertical displacement $h$ corresponding to the distance between D′ and the intersection of line DR and line C′D′, $h$ can also be indicated as $2S\theta$ tangent $\alpha$. The explanation has been based on the pivot point P remaining at a location substantially perpendicular to the reflecting faces from points A and D of the reflecting surfaces of prism 70.

Referring to FIGURE XIII and assuming that the prism pivot about a point P′ and that the distance from the pivot point P′ to the point P of prism L70 is indicated by $p$, therefore when the prism L70 pivots about the point P′ it moves through an angle $\theta''$ and the lateral displacement of point P to point P″ is $d = p\theta''$.

Referring to FIGURE XIII the displacement of prism L70 is assumed to be substantially rectilinear in the small angle of movement and the displacement $d$ and the angle between the line of sight OR and the left face L32′ of the displaced prism is $\alpha$ and therefore the displacement of the path of light is displaced the distance $d$ from the line LALB to line LA′LB′ in prisms L70 and L40.

Some of the possible modifications of the invention are illustrated in FIGS. V–XI.

In FIG. V which corresponds to the arrangement disclosed in detail in FIGS. I–IV, $m$ and $m' = 1$, $p$ is negative and tan $\alpha = 1$.

In FIG. VI the arrangement is the same as that shown in FIG. V except the point of suspension P′ is above the point P defined as the intersection of the normals to the reflecting surfaces 32 and 34 at the points of intersection with the line OR. In this figure, $m$ and $m'$ equal 1, $p$ is positive and tan $\alpha = 1$.

In FIG. VII the pivoted prism is off the line OR and is above the fixed prism. The points of suspension P′, P′ are above both prisms; $m$ and $m'$ are equal and negative, $p$ is negative and tan $\alpha =$ tan $\alpha' = 1$.

In FIG. VIII the pivoted prism is on the line joining the center of the objective combination to the center of the reticle and is below the fixed prism. The pivot point is below both prisms; $m$ and $m' = 1$, $p$ is positive and tan $\alpha =$ tan $\alpha' = 1$. It should be noted that FIG. VIII is the same as FIG. VI inverted. Any of the other embodiments may be inverted in a similar manner.

In FIG. IX the pivoted prism is off the line OR and is suspended on crossed links from two pivot points which according to Drodofsky make $m$ and $m' = -1$, $p$ is positive and tan $\alpha =$ tan $\alpha' = 1$.

In FIG. X, the pivoted prism is on the line OR and is suspended on parallel links from two pivot points. This results in pure displacement of the pivoted prism with no rotation with respect to the telescope housing. The fixed prism is below, $m$ and $m' = 1$, $p$ is positive and tan $\alpha =$ tan $\alpha' = 1$.

In the case of FIG. X the correction is achieved by a pure displacement of the pivoted prism with respect to the other prism using the principle illustrated in FIG. XIII and the principle utilized in FIG. XII is not needed. Similarly it is possible to base a design entirely on the principle illustrated in FIG. XII which is accomplished by merely making $p$ equal to 0; for example by placing the point of suspension P′ at the point P, as defined in connection with FIG. XII.

In the embodiment shown in FIG. XI the upper pair of reflecting surfaces are parallel to the line OR and P is at the intersection of the two lower reflecting surfaces. The arrangement of the reflection surfaces effectively forms a Porro prism with the difference that two of the reflecting surfaces are pivoted. The pivot point P′ can be either above or below P. Displacement between the two pairs of reflecting surfaces has no effect. If the pair of reflecting surfaces on the line joining the center of the lens to the center of the reticle rotates with respect to the other pair the formula given in conjunction with FIG. XII applies and the formula relating $f$ reduces to $f\theta = 2S\theta$.

While the construction of the invention has only been described in detail with an objective combination of the type disclosed in copending application Ser. No. 681,023, now Patent No. 2,937,570, it also has been pointed out that other types of objective combinations may be used. When some of these are used the line of sight may be displaced up or down as the instrument is tilted just as is the case in prior art automatic optical leveling devices. However, by skillful design these errors can be controlled within suitable tolerances or held to a negligible amount so that the construction herein described can be used to good advantage in instruments having objective combinations other than that disclosed in Ser. No. 681,023 now Patent 2,937,570.

Having thus described the invention, what is claimed is:

1. A self compensating telescope level comprising a telescope housing, an objective, reticle having an index mark and an eyepiece mounted in axial alignment on a common optical axis in said telescope housing, pendulum means mounted on said housing for swinging movement in the direction of the optical axis of said telescope level, reflecting means in the path of light passing between said objective and said reticle consisting of two pairs of reflecting surfaces, one of said pairs of reflecting surfaces lying on the optical axis of said telescope level and the other of said pair of reflecting surfaces being vertically spaced from the optical axis of said telescope and in substantially vertical alignment with said one of said pairs, one of said pairs of said reflecting surfaces being mounted on said pendulum means, the other of said pairs of reflecting surfaces being mounted in fixed relation on said telescope housing, said reflecting surfaces all lying in planes perpendicular to a common plane including the optical axis and all being at an acute angle to said optical axis, one of said reflecting surfaces of one of said pairs of reflecting surfaces lying in the path of light passing through said objective, one of said reflecting surfaces of the other of said pairs of reflecting surfaces lying in the path of light reflected from said one of said reflecting surfaces of said one of said pairs of reflecting surfaces, the other reflecting surface of said other of said pairs of reflecting surfaces lying in the path of light reflected from said one of said reflecting surfaces of said other of said pairs of reflecting surfaces and reflecting light to the other reflecting surface of said one of said pairs of reflecting surfaces, the said other reflecting surfaces of said one of said pairs of reflecting surfaces reflecting light to said reticle, said reflecting surfaces defining a generally U-shaped off-set light path portion with respect to the optical axis, said telescope being focusable to image at the index mark of said reticle points spaced along the line of sight whereby said imaged points lie on a level line of sight even though said telescope level is tilted through a limited angle with respect to the level direction.

2. The invention according to claim 1 in which the pair of reflecting surfaces mounted on the pendulum means lie on the optical axis and are positioned above the pair of reflecting surfaces fixed on the telescope.

3. The invention according to claim 1 in which the pair of reflecting surfaces mounted on the pendulum means are positioned on the optical axis and the pair of reflecting surfaces fixed to the housing are positioned above the pair of reflecting surfaces mounted on the pendulum means.

4. The invention according to claim 1 in which the pair of reflecting surfaces fixed to the telescope housing are positioned on the optical axis and the pair of reflecting surfaces mounted on the pendulum means is spaced vertically from the axis of the telescope.

5. The invention according to claim 1 in which the pendulum means includes a pair of links connected to one of the pair of reflecting surfaces and to the telescope housing at locations spaced apart in the axial direction of said telescope level.

6. The invention according to claim 5 in which the links are arranged in criss-cross relation.

7. The invention according to claim 5 in which the links are arranged in parallel relation.

References Cited by the Examiner

UNITED STATES PATENTS

| | | | |
|---|---|---|---|
| 1,628,777 | 5/1927 | Henderson | 88—1 |
| 2,386,621 | 10/1945 | Luboshez | 88—1 |
| 2,741,940 | 4/1956 | Drodofsky | 88—1 |
| 2,779,231 | 1/1957 | Drodofsky | 88—1 |
| 2,855,818 | 10/1958 | Wehling. | |
| 2,937,570 | 5/1960 | Hillman | 88—1 X |
| 2,981,141 | 4/1961 | Armstrong et al. | 88—1 |
| 2,997,912 | 8/1961 | Mikic | 88—1 |
| 3,014,283 | 12/1961 | Hofmann. | |
| 3,026,620 | 3/1962 | Rantsch. | |

FOREIGN PATENTS

| | | |
|---|---|---|
| 178,209 | 4/1954 | Austria. |
| 906,699 | 5/1945 | France. |

DAVID H. RUBIN, *Primary Examiner.*

EMIL G. ANDERSON, *Examiner.*